United States Patent
Gastineau et al.

(10) Patent No.: US 12,106,213 B2
(45) Date of Patent: Oct. 1, 2024

(54) SYSTEMS AND METHODS FOR AUTOMATICALLY DETERMINING ADJACENT PANEL DEPENDENCIES DURING DAMAGE APPRAISAL

(71) Applicant: Mitchell International, Inc., San Diego, CA (US)

(72) Inventors: Jerry Gastineau, San Diego, CA (US); Michael Milliken, San Diego, CA (US); Beau Sullivan, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 766 days.

(21) Appl. No.: 17/127,518

(22) Filed: Dec. 18, 2020

(65) Prior Publication Data
US 2021/0103817 A1    Apr. 8, 2021

Related U.S. Application Data

(63) Continuation-in-part of application No. 15/421,972, filed on Feb. 1, 2017.
(Continued)

(51) Int. Cl.
*G06N 3/08* (2023.01)
*G06N 5/025* (2023.01)
(Continued)

(52) U.S. Cl.
CPC ............... *G06N 3/08* (2013.01); *G06N 5/025* (2013.01); *G06Q 10/20* (2013.01); *G06Q 40/08* (2013.01)

(58) Field of Classification Search
CPC .......... G06N 3/08; G06N 5/025; G06N 3/044; G06N 5/01; G06N 7/01; G06N 20/20; G06Q 10/20; G06Q 40/08
See application file for complete search history.

(56) References Cited

U.S. PATENT DOCUMENTS

| 4,435,769 A | 3/1984 | Nagano et al. |
| 5,347,656 A | 9/1994 | Fabritz et al. |

(Continued)

FOREIGN PATENT DOCUMENTS

WO   WO2009129496 A2   10/2009

OTHER PUBLICATIONS

Huetter, J., "CCC:A.I. Claims tech could be offered to shops too," http://www.repairerdrivennews.com/2018/12/04/ccc-a-i-claims-tech-could-be-offered-to-shops-too/ (Dec. 4, 2018).
(Continued)

*Primary Examiner* — Alexandru Cirnu
(74) *Attorney, Agent, or Firm* — Gavrilovich, Dodd & Lindsey LLP

(57) ABSTRACT

A method, non-transitory computer readable medium, and apparatus that improves automated damage appraisal includes analyzing one or more obtained images of property using a deep neural network with multiple hidden layers of units between an input and output and which has stored knowledge data encoded from one or more stored property damage images to identify which area of the property has damage. Damage data on an extent of the damage in the identified area of the property is determined using the deep neural network which has stored knowledge data encoded from one or more stored property damage images. The identified damaged part and may be used to determine one or more adjacent parts based on the vehicle information and the repair operation type.

20 Claims, 7 Drawing Sheets

Related U.S. Application Data

(60) Provisional application No. 62/289,720, filed on Feb. 1, 2016.

(51) Int. Cl.
*G06Q 10/20* (2023.01)
*G06Q 40/08* (2012.01)

(56) References Cited

U.S. PATENT DOCUMENTS

| | | | |
|---|---|---|---|
| 5,395,664 | A | 3/1995 | Thompson, Jr. |
| 5,432,904 | A | 7/1995 | Wong |
| 5,504,674 | A | 4/1996 | Chen et al. |
| 5,593,225 | A | 1/1997 | Safyan |
| 5,809,732 | A | 9/1998 | Farmer, Sr. et al. |
| 5,950,169 | A | 9/1999 | Borghesi et al. |
| 6,047,858 | A | 4/2000 | Romer |
| 6,107,399 | A | 8/2000 | Selley et al. |
| 6,207,094 | B1 | 3/2001 | Farmer, Sr. et al. |
| 6,381,561 | B1 | 4/2002 | Bomar, Jr. et al. |
| 6,467,299 | B1 | 10/2002 | Coetzee |
| 6,470,303 | B2 | 10/2002 | Kidd et al. |
| 6,885,981 | B2 | 4/2005 | Bomar, Jr. et al. |
| 7,197,444 | B2 | 3/2007 | Bomar, Jr. et al. |
| 7,222,110 | B2 | 5/2007 | Onoue |
| 7,359,821 | B1 | 4/2008 | Smith et al. |
| 7,502,772 | B2 | 3/2009 | Kidd et al. |
| 7,698,086 | B2 | 4/2010 | Kidd et al. |
| 7,716,002 | B1 | 5/2010 | Smith et al. |
| 7,789,217 | B2 | 9/2010 | Fischer et al. |
| 7,809,587 | B2 | 10/2010 | Dorai |
| 7,974,808 | B2 | 7/2011 | Smith et al. |
| 8,019,629 | B1 | 9/2011 | Medina, III et al. |
| 8,095,391 | B2 | 1/2012 | Obora et al. |
| 8,160,904 | B1 | 4/2012 | Smith |
| 8,200,513 | B2 | 6/2012 | Vahidi et al. |
| 8,260,639 | B1 | 9/2012 | Medina et al. |
| 8,468,038 | B2 | 6/2013 | Vahidi et al. |
| 8,612,170 | B2 | 12/2013 | Smith et al. |
| 8,712,806 | B1 | 4/2014 | Medina, III et al. |
| 8,725,544 | B2 | 5/2014 | Vahidi et al. |
| 8,792,781 | B1 | 7/2014 | Randall et al. |
| 9,218,626 | B1 | 12/2015 | Haller, Jr. et al. |
| 9,228,834 | B2 | 1/2016 | Kidd et al. |
| 9,500,545 | B2 | 11/2016 | Smith et al. |
| 9,721,400 | B1 | 8/2017 | Oakes, III et al. |
| 9,846,093 | B2 | 12/2017 | Smith et al. |
| 10,339,728 | B1 | 7/2019 | Oakes, III et al. |
| 10,360,601 | B1* | 7/2019 | Adegan ............ G06Q 30/0283 |
| 10,410,439 | B1* | 9/2019 | Gingrich ............ G01N 29/069 |
| 10,510,142 | B1 | 12/2019 | Dohner et al. |
| 10,796,685 | B2 | 10/2020 | Gong et al. |
| 10,922,726 | B1 | 2/2021 | Nelson et al. |
| 10,949,814 | B1 | 3/2021 | Nelson et al. |
| 2004/0148188 | A1 | 7/2004 | Uegaki |
| 2005/0246206 | A1 | 11/2005 | Obora et al. |
| 2005/0251427 | A1 | 11/2005 | Dorai et al. |
| 2006/0064393 | A1* | 3/2006 | Orr .................. G06Q 10/10 705/400 |
| 2007/0071762 | A1 | 3/2007 | Ts'o et al. |
| 2009/0138290 | A1 | 5/2009 | Holden |
| 2009/0150200 | A1 | 6/2009 | Siessman |
| 2009/0265193 | A1 | 10/2009 | Collins et al. |
| 2011/0313951 | A1 | 12/2011 | Cook |
| 2012/0090956 | A1 | 4/2012 | Brobst |
| 2013/0317865 | A1* | 11/2013 | Tofte ................. G06Q 10/06 705/4 |
| 2014/0025403 | A1 | 1/2014 | Vahidi et al. |
| 2014/0058764 | A1 | 2/2014 | Vahidi et al. |
| 2014/0067429 | A1 | 3/2014 | Lowell |
| 2014/0067637 | A1 | 3/2014 | Vahidi et al. |
| 2014/0067735 | A1 | 3/2014 | Yu |
| 2014/0074865 | A1 | 3/2014 | Zobrist et al. |
| 2014/0081675 | A1 | 3/2014 | Ives et al. |
| 2014/0095133 | A1* | 4/2014 | Silva ................. G06Q 10/20 703/7 |
| 2014/0122130 | A1 | 5/2014 | Kelly et al. |
| 2014/0229123 | A1 | 8/2014 | Smith et al. |
| 2014/0279169 | A1 | 9/2014 | Leos |
| 2014/0316825 | A1 | 10/2014 | van Dijk et al. |
| 2015/0012169 | A1* | 1/2015 | Coard ............. G06Q 10/06316 705/305 |
| 2015/0039397 | A1* | 2/2015 | Fuchs ............... G06Q 30/0283 705/7.35 |
| 2015/0103170 | A1 | 4/2015 | Nelson et al. |
| 2015/0106133 | A1 | 4/2015 | Smith, Jr. |
| 2015/0213556 | A1 | 7/2015 | Haller, Jr. et al. |
| 2015/0294419 | A1 | 10/2015 | Gonzalez Miranda |
| 2016/0012539 | A1 | 1/2016 | Gorelov |
| 2016/0178465 | A1 | 6/2016 | Smith et al. |
| 2016/0292759 | A1* | 10/2016 | Gonzalez Miranda ................ G06F 3/04845 |
| 2017/0221110 | A1 | 8/2017 | Sullivan et al. |
| 2018/0101504 | A1 | 4/2018 | Ditomaso |
| 2018/0300576 | A1 | 10/2018 | Dalyac et al. |
| 2021/0150591 | A1 | 5/2021 | Gastineau et al. |

OTHER PUBLICATIONS

Hellyar, M., "CCC Introduces the World's First Artificial Intelligence Estimating Tool," https://www.cccis.com/2018/12/03/ccc-introduces-the-worlds-first-artificial-intelligence-estimating-tool/ (Dec. 3, 2018).

Novet, "Microsoft Researchers Say Their Newest Deep Learning System Beats Humans—And Google," Feb. 9, 2015, pp. 1-3, BIG-DATA.

He, et al., "Delving Depp Into Rectifiers: Surpassing Human-Level Performance On ImageNet Classification," Feb. 6, 2015, pp. 1-11.

Krizhevsky, Alex et al., "ImageNet Classification with Deep Convolutional Neural Networks," 2012, Advances in Neural Information Processing Systems 25 (NIPS 2012).

Extended European Search Report in EP 17154277.2, dated Jun. 30, 2017.

Office Action in European Patent Application No. 17154277.2, dated Nov. 19, 2019.

Examination Report in European Patent Application No. 17154277.2. dated Apr. 22, 2021.

* cited by examiner

FIG. 6

SYSTEMS AND METHODS FOR AUTOMATICALLY DETERMINING ADJACENT PANEL DEPENDENCIES DURING DAMAGE APPRAISAL

RELATED APPLICATIONS

This application is a continuation-in-part of U.S. patent application Ser. No. 15/421,972, filed on Feb. 1, 2017, entitled "Methods for Improving Automated Damage Appraisal and Devices Thereof", which claims the benefit of U.S. Provisional Application No. 62/289,720, entitled "Methods for Improving Automated Damage Appraisal and Devices Thereof", filed on Feb. 1, 2016, the contents of which are incorporated herein by reference in their entirety.

The present application is related to U.S. patent application Ser. No. 17/127,575, filed Dec. 18, 2020, entitled "Systems and Methods for Automatically Determining Associations Between Damaged Parts and Repair Estimate Information During Damage Appraisal", the disclosure of which is incorporated herein by reference in its entirety.

TECHNICAL FIELD

This technology generally relates to methods and devices for automated property damage appraisal and devices thereof.

BACKGROUND

Prior software appraisal technologies for automating property damage appraisals which rely on user input and/or predictive analytics to represent damage severity have issues with their ability to consistently provide accurate damage assessments. Estimating is highly subjective and historical estimating data often contains bias and may not represent optimal or accurate information. Subsequently, predictive models which are statistically derived purely from historical data will perpetuate these inaccuracies.

Prior software appraisal technologies for automating property damage appraisals which employ deformation measurement methods of image analysis, such as photogrammetry, require highly specialized and costly instrumentation and technical training to operate. These prior technologies function by comparing specific instances of damaged property to undamaged examples of the same property to calculate the deformation. The requirement to create and maintain a comprehensive catalog of benchmark examples of undamaged property is inefficient and cost prohibitive at scale.

These limitations, inefficiencies, and inconsistencies with these prior software appraisal technologies result in substantial additional costs as well as inconsistencies and errors with automated property damage appraisals.

SUMMARY

In accordance with one or more embodiments, various features and functionality can be provided for automatically determining adjacent panel dependencies during a damage appraisal process.

In some embodiments, one or more obtained images of property may be analyzed using a deep neural network with multiple hidden layers of units between an input and output, which has stored knowledge data encoded from one or more stored property damage images, to identify the part of the vehicle that has sustained damage. Damage data on an extent of the damage in the identified part of the vehicle is determined by using the deep neural network which has stored knowledge data encoded from one or more stored property damage images. One or more adjacent panels may be determined for each identified damaged part based on the type of the repair operations that need to be taken to repair the damage on the vehicle of a vehicle body type.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

FIG. 6 illustrates an example diagram of grouping estimate fragment lines of FIG. 5, according to an implementation of the disclosure.

DETAILED DESCRIPTION

Figure 1:
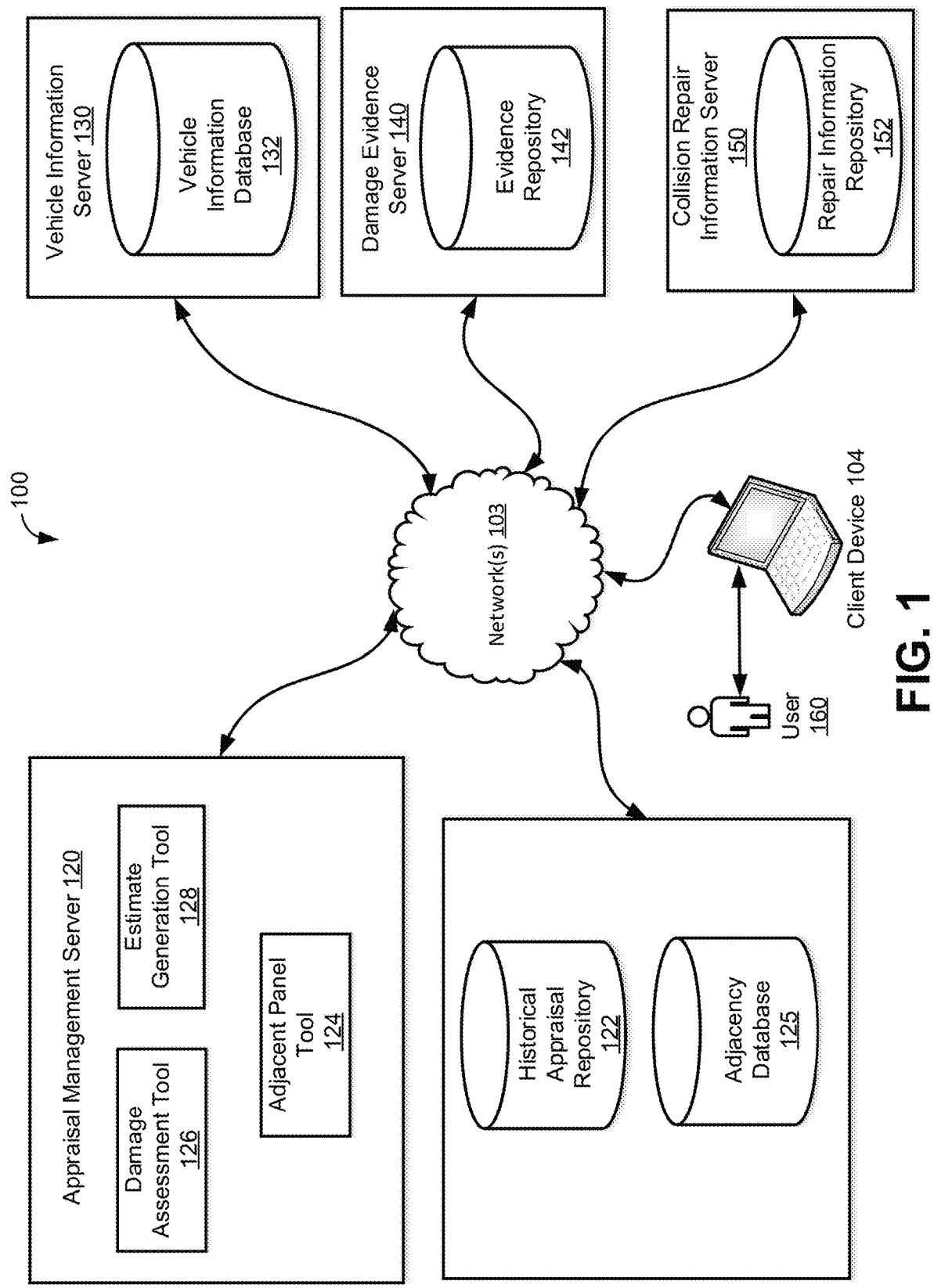
FIG. 1 illustrates example systems and a network environment, according to an implementation of the disclosure.

Described herein are systems and methods for process for automatically determining adjacent panel repair operations when restoring damaged panels of a vehicle involved in an adverse event (e.g., a collision accident). For example, the adjacent panel repair operations may be incorporated into a repair estimate resulting in a more complete and accurate repair estimate. Additionally, by utilizing adjacent rules database and estimate fragments, the system described herein may determine adjacent panel repair operations resulting in a time-effective manner without sacrificing accuracy. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

While restoring a damaged panel (e.g., by removing and replacing, or repairing it) may also damage one or more adjacent panels, the cost associated with restoring these adjacent panels is often overlooked and not included in the repair estimate. For example, upon removing a damaged welded-in panel for replacement, it is almost always necessary to repair one or more adjacent panels that have been damaged during the removal process. That is because the damage to the adjacent panels is unavoidable. Similarly, after removing a rear body panel (i.e., the panel damaged in a collision event), the left and right frame rail flanges, the left and right tail light pockets, the floor pan area, and possibly floor or quarter panel extensions (i.e., adjacent panels) may also need to be repaired.

Unlike the panels damaged in collision and thus subject to automatic damage appraisal which generates a repair estimate for restoring the damaged panel, adjacent panels do not include damage that may be appraised by a conventional solution. Thus, despite unavoidable required operations to adjacent panels during repair or replacement of the damaged panels, conventional automated repair estimate solutions do not address these required operations. For example, adjacent panels may require subsequent repair tasks to be performed on them, as a direct result of repair or replacement of the damaged panel. That is because adjacent panel repair estimate determinations are based on multitude of factors and conditions including for example, collision repair operations for repairing the damaged panel, vehicle type (e.g., 2-Door Coupe, 4-Door Sedan, etc.), and/or other such similar factors. For example, removal and replacement of a damaged left front passenger door in a 4-Door Sedan would necessitate additional refinish operations to the left rear passenger door, while similar operations would not be performed in a 2-Door Coupe.

Figure 2A:
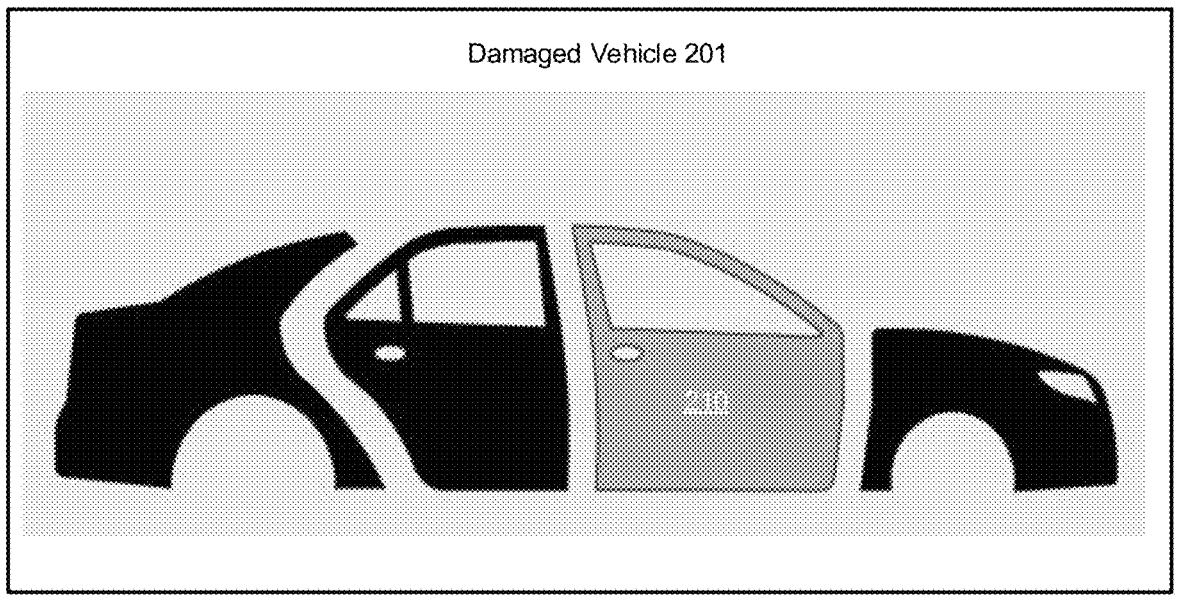
FIG. 2A illustrates an example output of a process for determining a damaged panel without identifying adjacent panels that may need to be repaired, according to an implementation of the disclosure.
Figure 2B:
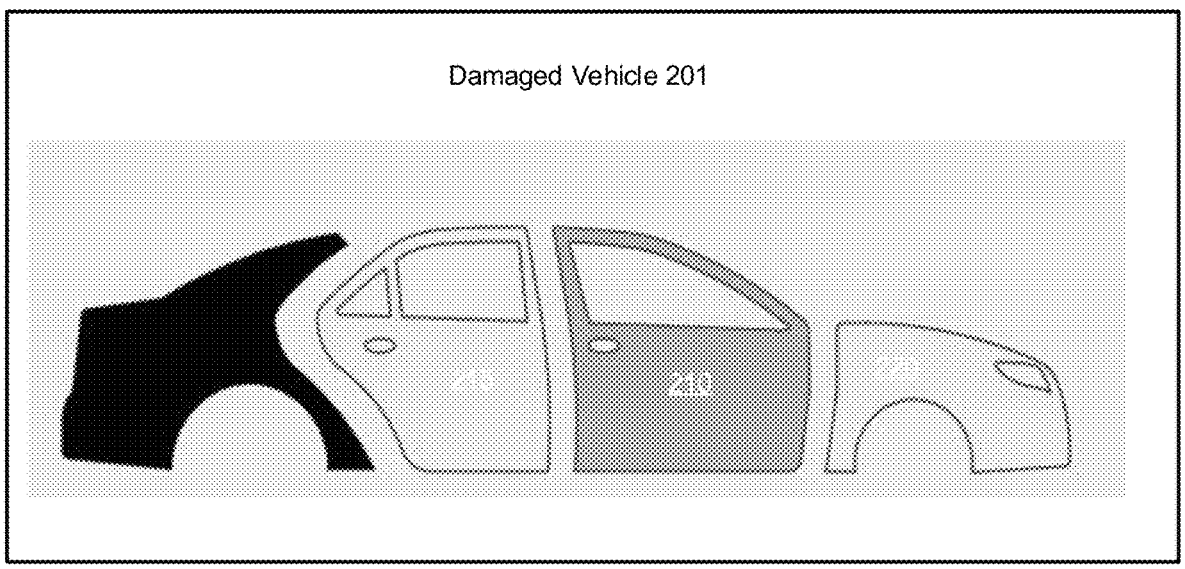
FIG. 2B illustrates an example output of a process for determining a damaged panel that identifies adjacent panels that may need to be repaired, according to an implementation of the disclosure.

As alluded to above, existing technology solutions fail to provide a cost-effective method to automatically determine adjacent panel repair operations when restoring damaged panels of a vehicle. For example, as illustrated in FIG. 2A, during an automatic damage appraisal, a conventional process may identify a damaged panel 210 of a damaged vehicle 201. However, the conventional process will fail to identify non-damaged adjacent panels 215 and 220, which may need to have remove/install operations and refinish operations performed after the damaged panel 210 is replaced, as illustrated in FIG. 2B.

By utilizing dependencies determined for each vehicle panel for each vehicle body type (e.g., 2-Door coupe) and each repair operation type (e.g., replace, repair, or blend), which itself is determined based on the extent of the damage, as described herein, the present embodiments may automatically determine adjacent panels and their associated repair operations. Furthermore, by utilizing the automatically generated estimate fragment data, the system may generate a repair estimate that includes repair estimate lines for repairing the primary panel and one or more adjacent panel determined using rules of adjacency. The automatically generated estimate fragment data may be user-configurable to allow modification to the automatically determined adjacent panel repair estimate lines.

Environment

FIG. 1 illustrates an example network environment architecture 100 which provides enhanced damage appraisal process, particularly when determining associations between damaged parts and repair estimate information. In some embodiments, environment 100 may include an appraisal management server 120, a vehicle information server 130, a damage evidence server 140, a collision repair information server 150, a client computing device 104, and a network 103. A user 160 may be associated with client computing device 104 as described in detail below. Additionally, environment 100 may include other network devices such as one or more routers and/or switches.

In some embodiments, client computing device 104 may be configured to capture damage evidence, including images and/or videos used in the damage appraisal process. For example, the images may be captured by a user 160 (e.g., an insured/claimant) or by an unmanned aerial vehicle (UAV) configured to capture the images without user input. In some embodiments, client computing device 104 may be configured to generate a three dimensional (3D) scan of the vehicle.

Appraisal Management Server

In some embodiments and as will be described in detail further below, appraisal management server 120 may include a processor, a memory, and network communication capabilities. In some embodiments, appraisal management server 120 may be a hardware server. In some implementations, appraisal management server 120 may be provided in a virtualized environment, e.g., appraisal management server 120 may be a virtual machine that is executed on a hardware server that may include one or more other virtual machines. Additionally, in one or more embodiments of this technology, virtual machine(s) running on appraisal management server 120 may be managed or supervised by a hypervisor. Appraisal management server 120 may be communicatively coupled to a network 103.

In some embodiments, the memory of appraisal management server 120 may store application(s) that can include executable instructions that, when executed by appraisal management server 120, cause appraisal management server 120 to perform actions or other operations as described and illustrated below with reference to FIGS. 3-6. For example, appraisal management server 120 may include a damage assessment tool 126, an estimate generation tool 1286, and an adjacent panel tool 130.

Damage Assessment Tool

Damage assessment tool 126 may be configured to utilize one or more trained neural network models or other machine learning algorithms and the damage evidence information, including metadata, historical damage appraisal data, and other similar evidence to automatically identify one or more damaged parts and their relationship or association to actual parts of a vehicle. For example, damage assessment tool 126, may use the machine learning algorithm to analyze a plurality of images associated with a damaged vehicle. Further, tool 126 may determine that the front panel of the vehicle is damaged. Finally, tool 126 may identify the front panel as the front bumper of the vehicle. Additionally, damage assessment tool 126 may determine the extent to which the part was damaged, as described in detail below.

In some embodiments, damage assessment tool 126 may be configured to use one or more of a deep learning model, a logistic regression model, a Long Short Term Memory (LSTM) network, supervised or unsupervised model, etc. In some embodiments, repair procedures identification component 108 may utilize a trained machine learning classification model. For example, the machine learning may include decision trees and forests, hidden Markov models, statistical models, cache language model, and/or other models. In some embodiments, the machine learning may be unsupervised, semi-supervised, and/or incorporate deep learning techniques.

Estimate Generation Tool

Estimate generation tool 128 may be configured to utilize one or more trained neural network models or other machine learning algorithms and the damage evidence information, historical damage evidence information, vehicle information, repair information, sensor data, feedback data, and other such data, to obtain repair procedures (i.e., stored repair lines, such as labor operations) for restoring the vehicle part to OEM approved specifications. For example, the part damaged associated with the damaged vehicle may be repaired or replaced the part.

Adjacent Panel Tool

Adjacent panel tool 124 may be configured to identify adjacent panels and the corresponding repair operations for repairing adjacent panels after the damaged panel is repaired, replaced and/or otherwise restored. For example, the damaged panel may have one or more dependencies to one or more adjacent panels. In some embodiments, adjacent panel tool 124 may utilize rules of adjacency stored in an adjacency databased 125, as described herein, which indicate the dependencies between a primary panel (i.e., a damaged panel) and one or more adjacent panels based on vehicle type (4-Door Sedan, Minivan, and so on) and repair operations determined for restoring the primary panel (replace vs. repair). That is, by using the rules of adjacency for a particular vehicle type/year/make/model/sub model/body type, tool 124 may determine one or more adjacent panels which may need to be repaired as a result of restoring the primary panel.

Further, adjacent panel tool 124 may be configured to utilize repair estimate lines data to generate estimate fragments. An estimate fragment is a collection of repair lines that represent multiple tasks necessary to perform a larger operation. For example, the operation "Blend Door" may include a collection of tasks, i.e., refinish operations, remove/install operations, and additional operations such as mask for overspray or color sand and buff.

The estimate fragments may be used when generating the repair estimate for restoring the primary panel and the adjacent panels, as described in detail further herein.

In some embodiments, distributed damage assessment tool 126, estimate generation tool 128, and adjacent panel tool 124 may each be implemented using a combination of hardware and software. In some embodiments, damage assessment tool 126, estimate generation tool 128, and adjacent panel tool 124 may each be a server application, a server module of a client-server application, or a distributed application.

The application(s) can be implemented as modules, engines, or components of other application(s). Further, the application(s) can be implemented as operating system extensions, modules, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application(s), and even the repair management computing device itself, may be located in virtual server(s) running in a cloud-based computing environment rather than being tied to one or more specific physical network computing devices. Also, the application(s) may be running in one or more virtual machines (VMs) executing on the repair management computing device.

In some embodiments, environment 100 may also include one or more databases. For example, a historic appraisal repository 122 may be configured to store historic records and/or other data related to prior appraisals. Finally, an adjacency database 125 may be used by adjacent panel tool 130 to identify dependencies between the damaged panels one or more adjacent panels. In some embodiments, adjacency database 125 may store data related to the rules of adjacency, i.e., associations between the primary panel and one or more adjacent panel for a particular vehicle type/year/make/model/sub model/body type. The rules of adjacency dictate which adjacent panels and the type of repair operations that may need to be used when restoring a particular primary panel. Adjacency database 125 may be populated using proprietary data including known or identified dependencies and associations, as alluded to above.

Additionally, the dependencies between the primary panel and one or more adjacent panels for a particular vehicle type/year/make/model/sub model/body type stored in adjacency database 125 may be used to generate estimate fragments, i.e., parts of a repair estimate generated for restoring a particular primary panel and the one or more associated adjacent panels, as will be described further.

In other embodiments, environment 100 may include one or more training databases configured to store training data related to past appraisals used by damage assessment tool 126 and/or estimate generation tool 128 to train the trained neural network module. In yet other embodiments, databases may include one or more database configured to store machine learning data, and/or other information used by appraisal management server 120.

In some embodiments, appraisal management server 120 can be a standalone device or integrated with one or more other devices or apparatuses, such as one or more of the storage devices, for example. For example, appraisal management server 120 may include or be hosted by one of the storage devices, and other arrangements are also possible.

In some embodiments, appraisal management server 120 may transmit and receive information to and from client computing device 104, vehicle information server 130, damage evidenced server 140, collision repair information server 150, and/or other servers via network 103. For example, a communication interface of the appraisal management server 120 may be configured to operatively couple and communicate between client computing device 104, vehicle information server 130, damage evidence server 140, collision repair information server 150, which are all coupled together by the communication network(s) 103.

API

In some embodiments, appraisal management server 120 may include a method for exchanging data between appraisal management server 120 and various systems utilized in the collision repair, billing, and automotive claims processes described herein, including, for example, vehicle information server 130, damage evidence server 140, and collision repair information server 150). In some embodiments, the implementation of the systems and methods described herein may include the publication of a Software Developers Kit (SDK) and/or an Application Programming Interface (API) that will allow for application developers and data providers to implement Interfaces among the various components of the systems. The API data exchange may be accomplished using Standardized Transactions (e.g., CIECA BMS transactions, etc.) or may be by using other published or custom data formats.

For example, API may be integrated with OEM and other third party repair procedure data providers to allow user access to repair procedures via the appraisal management server 120 during the course of repairs, as described herein. This could include both repair procedure data from the vehicle manufacturer (e.g., Toyota, Honda, Ford, G/M, etc.) and third party sources (e.g., I-CAR, ETI, AllData, etc.). This integration of the appraisal management server 120 with the damage evidence and the repair procedures allows the appraisal management server 120 to automatically generate repair estimate lines for a part identified as damaged for a particular vehicle.

As another example, integration may be provided via API with other collision information systems, which may or may not be in use at the collision repair facility, including the repair facility's estimating system and other systems in use by the repair facility for management. In some embodiments, API may be utilized for data exchange with vehicle OEMs, insurers' claims management systems, parts manufacturers and suppliers, and other entities involved in the automotive collision and claims processes.

Vehicle Info Server

In some embodiments, vehicle information server 130 may be configured to store and manage vehicle information associated with a damaged vehicle. For example, vehicle information may include vehicle identification information, such as Vehicle Identification Number (VIN), make, model, and optional modifications (e.g., sub-model and trim level), including installed vehicle components based on the option and trim packages included on the specific vehicle, date and place of manufacture, and similar information related to a damaged vehicle.

The vehicle information server 130 may include any type of computing device that can be used to interface with the appraisal management server 120, damage evidence server 140, collision repair information server 150, and client computing device 104. For example, vehicle information server 130 may include a processor, a memory, and a communication interface, which are coupled together by a bus or other communication link, although other numbers and/or types of network devices could be used. In some embodiments, vehicle information server 130 may also include a database 132. For example, database 132 may include a plurality of databases configured to store content data associated with vehicle information, as indicated above. Vehicle information server 130 may run interface applications, such as standard web browsers or standalone client applications, which may provide an interface to communicate with the repair management computing device via the communication network(s). In some embodiments, vehicle information server 130 may further include a display device, such as a display screen or touchscreen, and/or an input device, such as a keyboard, for example.

Damage Evidence Server

In some embodiments, damage evidence server 140 may be configured to store and manage data related to damage sustained by a vehicle. Damage evidence server 140 may include processor(s), a memory, and a communication interface, which are coupled together by a bus or other communication link, although other numbers and/or types of network devices could be used. In some embodiments, damage evidence server 140 may also include an evidence repository 142. For example, evidence repository 142 may include a plurality of databases configured to store content data associated with damage the vehicle sustained in an adverse event such as collision. Damage evidence data may include images, videos, 3D renderings, scans, holograms, telematics data, audio recordings, and any data identifying vehicle damage. The damaged evidence data may be captured by user 160 operating client computing devices 104 configured as image capture devices, as explained earlier.

In some embodiments, the damage evidence data may include historic data comprising of damage records related to a plurality of adverse events associated with a plurality of vehicles, thereby providing the data related to prior appraisals and repair estimates. For example, a plurality of past estimates that have been authored may be analyzed by identifying estimate lines that may be commonly found together.

In some embodiments, damage evidence server 140 may include any type of computing device that can be used to interface with the appraisal management server 120 to efficiently optimize the collision repair process, as will be described further below. For example, damage evidence server 140 may include a processor, a memory, and a communication interface, which are coupled together by a bus or other communication link, although other numbers and/or types of network devices could be used.

In some embodiments, damage evidence server 140 may run interface applications, such as standard web browsers or standalone client applications, which may provide an interface to communicate with the appraisal management server 120 via the communication network(s) 103. In some embodiments, damage evidence server 140 may further include a display device, such as a display screen or touchscreen, and/or an input device, such as a keyboard, for example.

In some embodiments, the memory of damage evidence server 140 may store application(s) that can include executable instructions that, when executed by damage evidence server 140, cause damage evidence server 140 to perform actions or other operations.

Collision Repair Info Server

In some embodiments, collision repair information server 150 may be configured to store and manage data related to information associated with collision repair. Collision repair information server 150 may include processor(s), a memory, and a communication interface, which are coupled together by a bus or other communication link, although other numbers and/or types of network devices could be used. In some embodiments, collision repair information server 150 may also include a database 152. For example, repair information repository 152 may include a plurality databases configured to store content data associated with repair (e.g., workflow repair procedures, including textual information, images, videos, with and without an audio guide, and/or animations, including 3D animations) demonstrating how to perform repairs of various parts for a variety of different types and models of vehicles. The repair data may include part numbers, wiring diagrams, standard repair times, and other repair procedure information. Additionally, repair information repository 152 may include sensor calibration documentation data, and other similar information. Additionally, database 152 of collision repair information server 150 may include information related to repair standards (e.g., safety standards or manufacturer standards). The content data associated with repair procedures may be encoded and arranged in accordance with a file type specification comprising a particular set of rules, each type of file (text, image, video, audio, and so on) having an associated set of rules. In some embodiment repair information may include repair procedures generated by automakers (OEMs). Alternatively, repair information may include repair procedure information and/or part information generated by a proprietary program or obtained from another third-party source (e.g., insurance carrier).

In some embodiments, collision repair information server 150 may include any type of computing device that can be used to interface with the appraisal management server 120 to efficiently optimize the collision repair process. For example, collision repair information server 150 may include a processor, a memory, and a communication interface, which are coupled together by a bus or other communication link, although other numbers and/or types of network devices could be used.

In some embodiments, collision repair information server 150 may run interface applications, such as standard web browsers or standalone client applications, which may provide an interface to communicate with the appraisal management server 120 via the communication network(s) 103. In some embodiments, collision repair information server 150 may further include a display device, such as a display screen or touchscreen, and/or an input device, such as a keyboard, for example.

In some embodiments, the memory of collision repair information server 150 may store application(s) that can include executable instructions that, when executed by collision repair information server 150, cause collision repair information server 150 to perform actions or other operations.

An example schematic for improving automated damage appraisal will now be described with reference to FIG. 3, although this technology can be used in the same manner for other types of applications, such as using the same process that is illustrated and described by way of the examples herein to automate the process of determining one or more adjacent panels that need to be restored as a result of performing a repair operation of a particular type on a damaged panel for a particular vehicle type/year/make/model/sub model/body type.

Process

Figure 3:
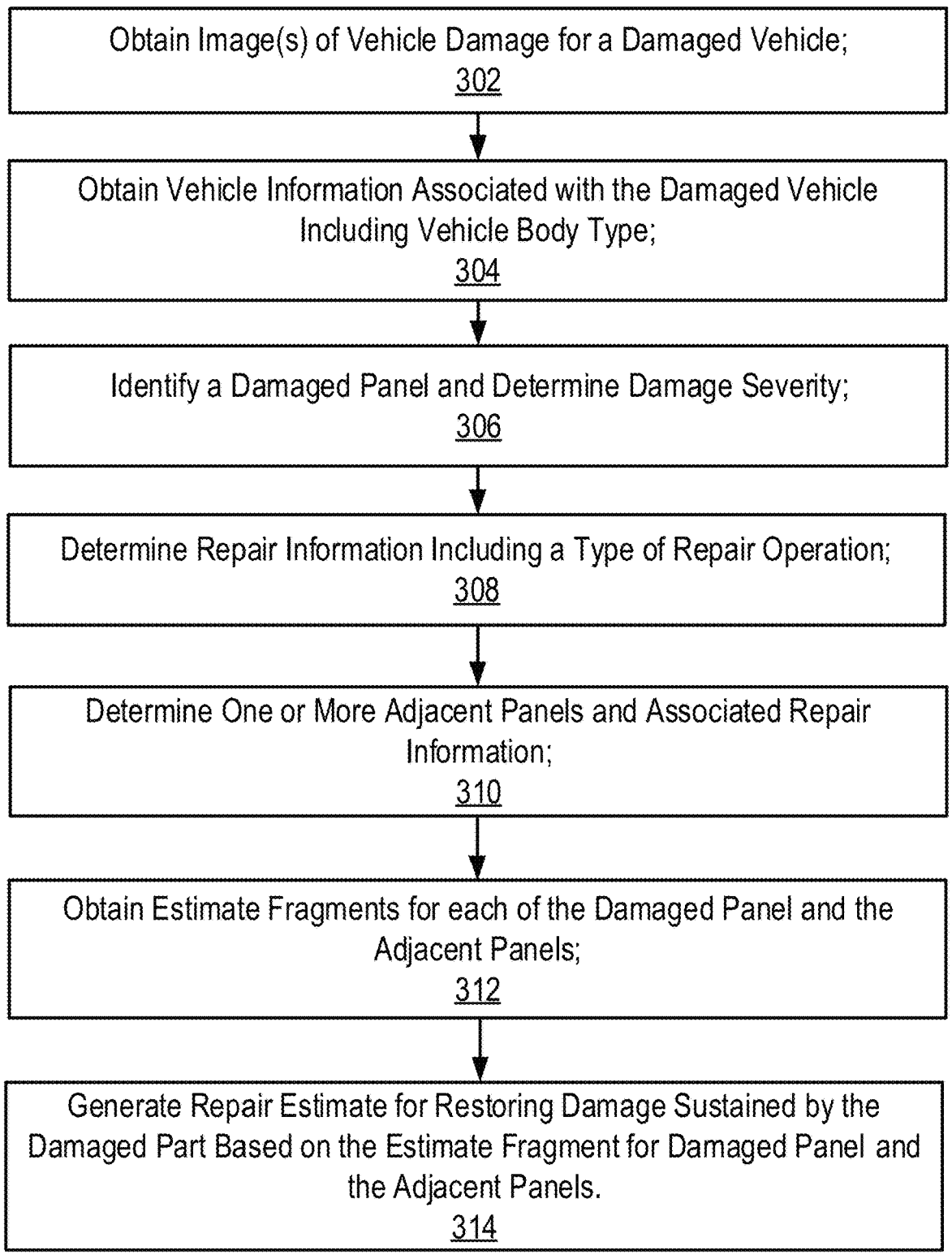
FIG. 3 illustrates an example process for automatically determining adjacent panels that may need to be repaired, according to an implementation of the disclosure.

Referring more specifically to FIG. 3, at step 302, evidence data may be received. For example, damage assessment tool (e.g., tool 126 illustrated in FIG. 1) may receive damaged evidence from an evidence repository (e.g., evidence repository 142 illustrated in FIG. 1). As alluded to above, evidence repository may store a plurality of damage evidence including image, videos, 3D scans, and/or similar information related to a damaged vehicle. In some embodiments, individual evidence records (e.g., images) may be captured by a user or and may be requested by appraisal management server 120.

In step 304, vehicle information associated with the damaged vehicle may be obtained. For example, vehicle information including vehicle identification number (VIN), of the vehicle may be obtained in connection with the damaged vehicle. For example, VIN may be obtained using vehicle information database (vehicle information database 132 illustrated in FIG. 1). In some embodiments, VIN may be used obtain additional details related to the damaged vehicle, including vehicle type (e.g., Sedan, Coupe, etc.), vehicle body type (e.g., 2-Door Sedan, 4-door Sedan, etc.) and other such details.

Next in step 306, the one or more damage evidence records may be analyzed to determine one or more damaged panels and the severity of the damage. For example, damage assessment tool (e.g., damage assessment tool 126 illustrated in FIG. 1) may be configured to utilize one or more trained neural network models or other machine learning algorithms and the damage evidence information, including metadata, historical damage appraisal data, and other similar evidence to automatically identify one or more damaged panel and their relationship or association to actual panels of a vehicle. For example, damage assessment tool, may use the machine learning algorithm to analyze a plurality of images associated with a damaged vehicle. Further, damage assessment tool may determine that the front panel of the vehicle is damaged. Finally, damage assessment tool may identify the front panel as the front bumper of the vehicle. Additionally, damage assessment tool may determine the extent to which the panel was damaged, as described in detail below.

In some embodiments, damage assessment tool may be configured to use one or more of a deep learning model, a logistic regression model, a Long Short Term Memory (LSTM) network, supervised or unsupervised model, etc. In some embodiments, damage assessment tool may utilize a trained machine learning classification model. For example, the machine learning may include decision trees and forests, hidden Markov models, statistical models, cache language model, and/or other models. In some embodiments, the machine learning may be unsupervised, semi-supervised, and/or incorporate deep learning techniques.

In some embodiments, one or more obtained images of property may be analyzed using a deep neural network (DNN) with multiple hidden layers of units between an input and output, which has stored knowledge data encoded from one or more stored property damage images, to identify the panel of the vehicle that has sustained damage. Damage data on an extent of the damage in the identified panel of the vehicle may be determined by using the deep neural network which has stored knowledge data encoded from one or more stored property damage images. For example, DNN may comprise stacked deep neural networks in which many hidden layers between the input and output layer use multiple processing layers composed of multiple linear and/or non-linear transformations for aspects of automated damage appraisal. Additionally, the DNN may have a structure and synaptic weights trained using semi-supervised machine learning techniques in conjunction with labelled and unlabeled data to encode knowledge obtained from earlier damage evidence data, collision repair information and/or other historic data. By virtue of using a DNN results in providing a significantly more effective and cost efficient automatic damage assessment than compared with using a simple neural network. In particular, when used by the damage assessment tool (e.g., damage assessment tool 126 illustrated in FIG. 1), DNN identifies damaged part and operations that need to be performed to restore the damage. Other artificial intelligence techniques may be used instead of, or in addition to, using a machine learning model. By virtue of utilizing a machine learning approach enhances the automated mapping process described herein.

Figure 4:
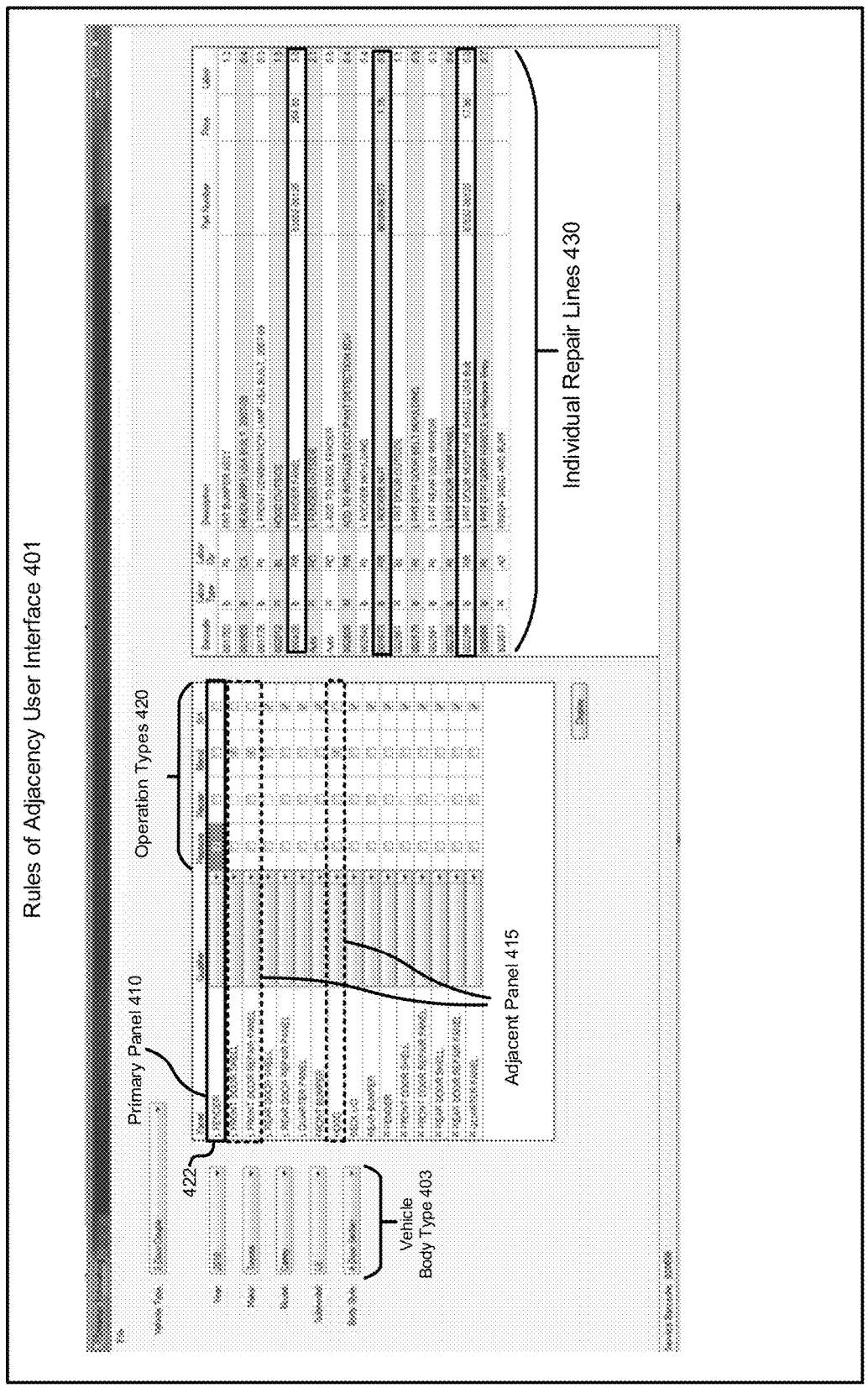
FIG. 4 illustrates an example administrative user interface associated with creating, viewing, modifying, and maintaining adjacent panel data determined by the process of FIG. 3, according to an implementation of the disclosure.

In step 308, the repair information for each identified damaged panel (determined in step 306) based on the vehicle information (determined in step 304) may be determined. The repair information may indicate the type of repair operations based on the severity of damage determined in step 306. For example, as illustrated in FIG. 4, primary damaged panel 410 for a vehicle body type 403 may be determined to have damage that requires a repair operation of a type "Replace". The repair operation types may be selected from a set of operation types 420 (e.g., "Replace," "Repair," or "Blend"). For example, L FENDER primary panel may require "Replace" repair operation. In some embodiments, the information determined in step 308 may be presented to a user via an administrative user interface 401. In particular, interface 401 may be used by administrative and/or internal users rather than end users of the estimating solution of appraisal management server 120, for example. In other embodiments, interface 401 may be configured to be used by the end user of the estimating solution of appraisal management server 120 when managing the rules of adjacency are being delivered to individual estimating users.

The user may utilize interface 401 to view, verify, and/or modify the system generated determinations. For example, the user may change the repair operation from "Replace" to "Repair" by selecting the corresponding check box associated with operation types 420.

Referring back to FIG. 3, in step 310, one or more adjacent panels and their associated repair information may be determined based on the primary panel repair information determined in step 308. In some embodiments, the adjacent panel and its associated repair information may be determined using an adjacency database (e.g., adjacency database 125 illustrated in FIG. 1). For example, as illustrated in FIG. 4, adjacent panel 415 may be identified based on primary damaged part 410 associated with operation type "Replace" for a vehicle body type 403. Each adjacent panel 415 may include repair operations that may need to performed to restore the damage to the damage vehicle. For example, L FRONT DOOR SHELL, L FRONT DOOR REPAIR PANEL, and HOOD adjacent panels may require "Blend" repair operations.

Referring back to FIG. 3, in some embodiments, in step 310, the adjacent panel determinations may be recorded as individual dependencies between the primary part and the one or more adjacent parts in the adjacent database (e.g., adjacency database 125 illustrated in FIG. 1).

In step 312, repair estimate fragments may be obtained for each the primary part and the one or more adjacent parts determined in step 310. A fragment may include a primary panel and one or more adjacent panels that require repairs. Repair estimate fragments may represent individual parts or blocks of an estimate, i.e., individual repair lines including parts and labor operations for a particular fragment. In some embodiments repair fragments may be automatically generated. For example, the one or more repair lines may be obtained using collision repair information repository (collision repair information repository 152 illustrated in FIG. 1).

Figure 5:
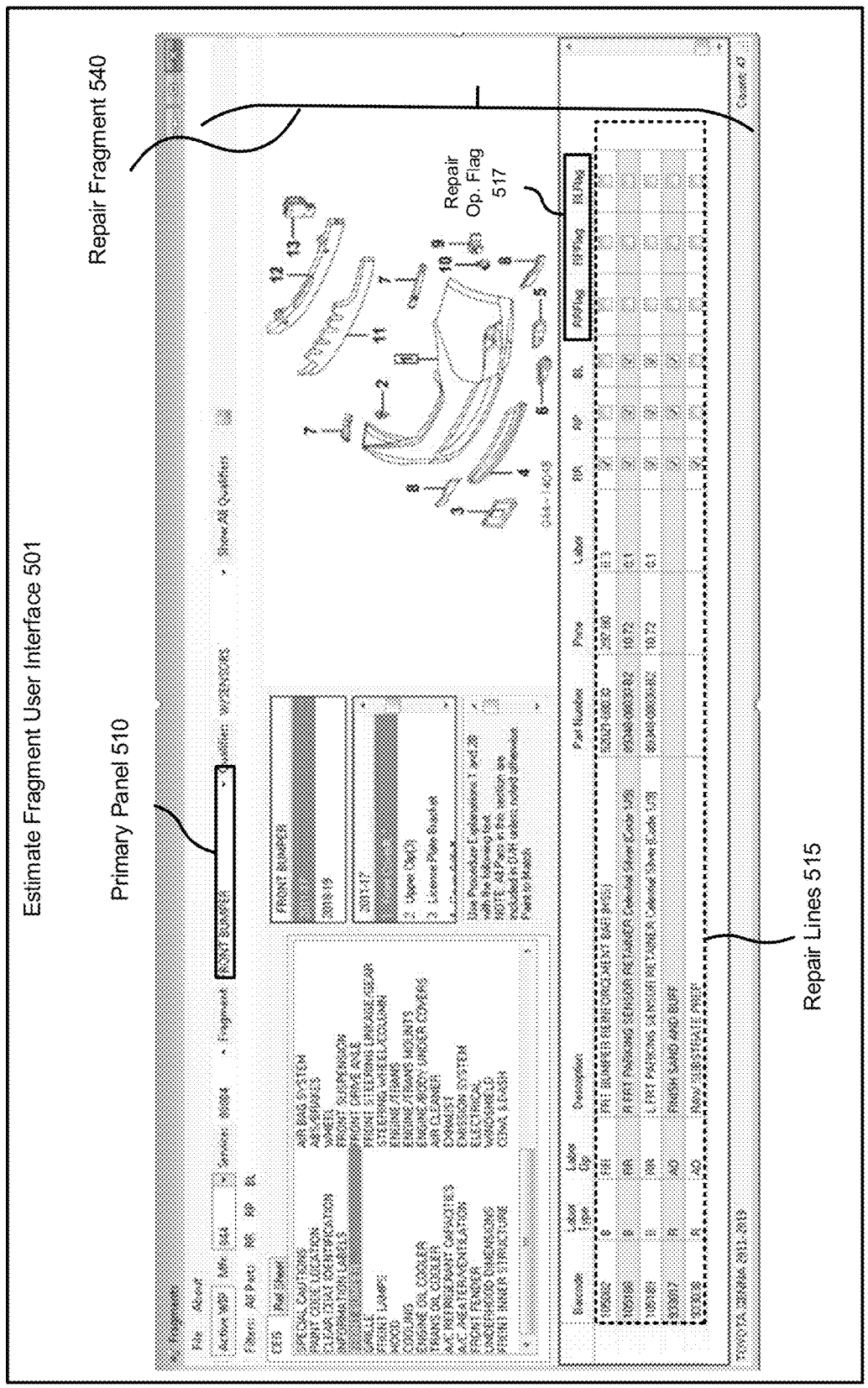
FIG. 5 illustrates an example administrative user interface associated with creating, viewing, modifying, and maintaining estimate fragment data determined by the process of FIG. 3, according to an implementation of the disclosure.

As illustrated in FIG. 5, a user may review a repair fragment 540 for replacing primary panel 510 generated in step 312. The repair fragment 540 may include repair lines 515 for repairing each adjacent panel. For example, individual repair lines 515 may include a barcode associated with a part; a labor type such as "B" or Body or "R" "Refinish; a type of repair operation such as "RR" or Remove and Replace, "RI" or Remove and Install, "CA" or Check/Adjust, "BL" or Blend, "RO" or Refinish Only, and "AO" or Additional Operations; a pat number, a price associated with part and/or labor, labor quantity in hours. By virtue of utilizing the administrative user interface 501, the user may view, add, and/or change the generated repair lines for fragment 540. For example, the user may change the labor operation by selecting the checkbox with the appropriate labor operation. Further, as alluded to above, administrative user interface 501 may be used to create the estimating fragments. Additionally, the user may "flag" one or more types of repair operations for one or more repair lines using repair operations flags 517. The repair operations flags may provide a repair technician with a cue to review and/or consider repair operations of the selected type in addition to the repair operations indicated in the repair estimate. In other embodiments, flags 517 may represent instructions to the estimate generating tool 128 of appraisal management system 120 to modify certain aspects of individual repair lines inside the fragment grouping.

In some embodiments, repair lines 515 of the estimate fragment 540 determined in step 312 may be viewed via user interface 401 as repair lines 430, as illustrated in FIG. 4.

In step 314, a repair estimate for restoring the damage sustained by the primary damaged panel of the damaged vehicle may be generated. For example, the estimate may include estimate fragments for multiple primary panels. As alluded to above, each estimate fragment may include individual repair lines for repairing the primary panel and the associated adjacent panels. In some embodiments, the repair estimate may be generated by an estimate generator tool (e.g., estimate generator tool 128 illustrated in FIG. 1). In some embodiments, the estimate generator tool may perform further calculations using one of a plurality of stored customer profile settings to further refine the updated list of one or more parts and/or one or more repair lines based on one or more customer requirements and/or preferences, although other types of refining calculations may be applied.

Figure 6:
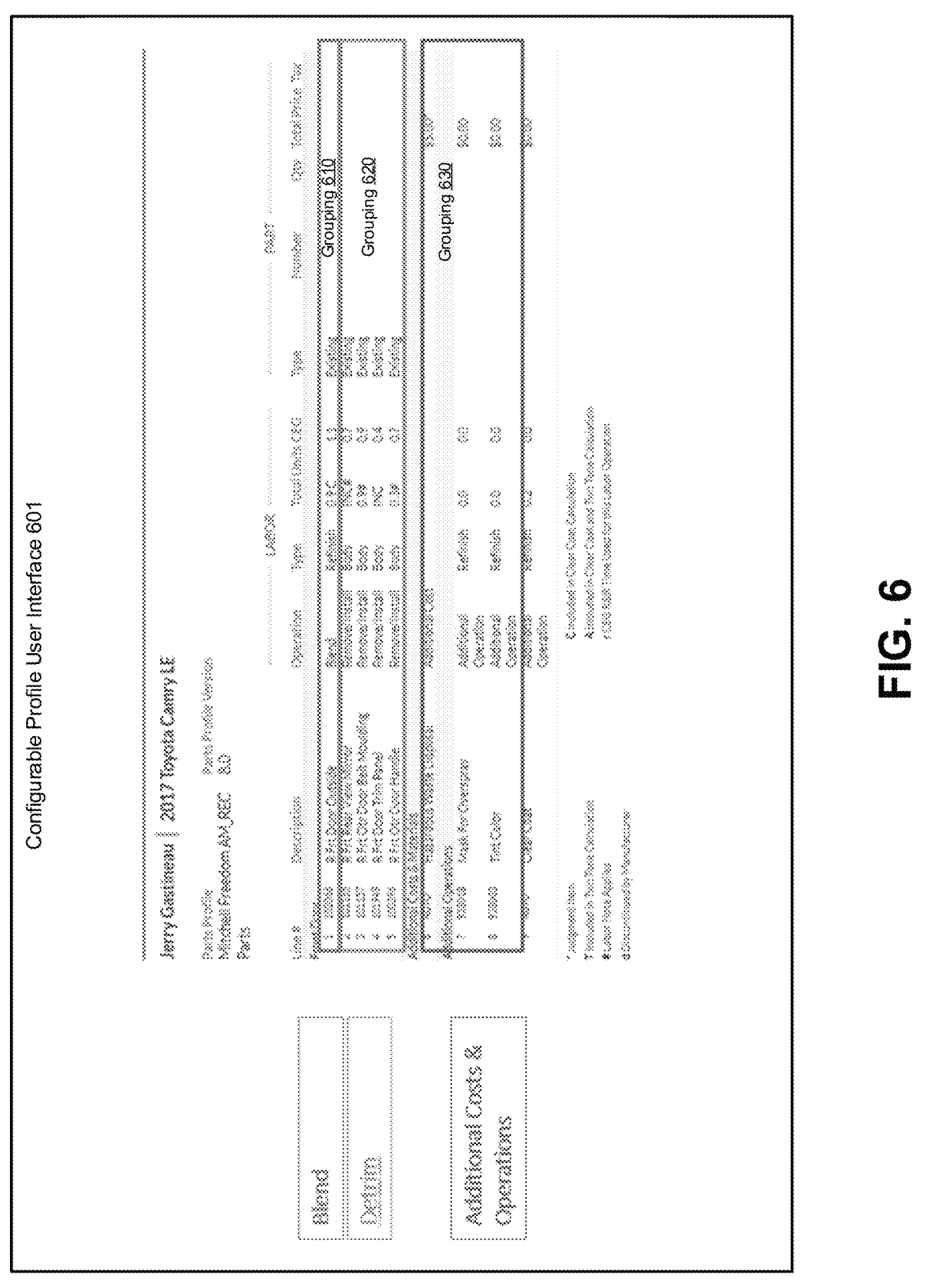

In some embodiments, the user may want to create specific business rules that determine the way certain types of repair lines appear on the final estimate of assembled estimate fragments. For example, as illustrated in FIG. 6, individual estimate fragment lines can be logically grouped into one or more categories. For example, operations that require blending tasks may be grouped in a grouping 610 "Blend". By contrast, operations that require tasks or removal or installation may be grouped in a grouping 620 "Detrim". Finally, tasks that require additional costs or operations may be grouped in a grouping 630 Additional Costs & Operations".

This added control results in a more customized estimate fragment. For example, in a particular geographic location the insurance carriers may not compensate the repair shop for performing "Blend" type operations. Thus, by excluding repair lines of a particular type from the estimate fragment results in a repair estimate more specifically suited for a particular set of conditions (e.g., geographic location).

System Architecture

In some embodiments, appraisal management server 120, vehicle information server 130, damage evidence server 140, and collision repair information server 150 may be a single device. Alternatively, in some embodiments, vehicle information server 130, repair information servers 140, and collision repair information server 150 may include a plurality of devices. For example, the plurality of devices associated with appraisal management server 120, vehicle information server 130, damage evidence server 140, and collision repair information server 150 may be distributed across one or more distinct network computing devices that together comprise one or more appraisal management server 120, vehicle information server 130, damage evidence server 140, and collision repair information server 150.

In some embodiments, appraisal management server 120, vehicle information server 130, damage evidence server 140, and collision repair information server 150 may not be limited to a particular configuration. Thus, in some embodiments, appraisal management server 120, vehicle information server 130, damage evidence server 140, and collision repair information server 150 may contain a plurality of network devices that operate using a master/slave approach, whereby one of the network devices operate to manage and/or otherwise coordinate operations of the other network devices. Additionally, in some embodiments, appraisal management server 120, vehicle information server 130, damage evidence server 140, and collision repair information server 150 may comprise different types of data at different locations.

In some embodiments, appraisal management server 120, vehicle information server 130, damage evidence server 140, and collision repair information server 150 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary network environment 100 with client computing device 104, appraisal management server 120, vehicle information server 130, damage evidence server 140, collision repair information server 150, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as client computing device 104, appraisal management server 120, vehicle information server 130, damage evidence server 140, and/or collision repair information server 150 may be configured to operate as virtual instances on the same physical machine. In other words, one or more of client computing device tool 104, appraisal management server 120, damage evidence server 140, and/or collision repair information server 150, may operate on the same physical device rather than as separate devices communicating through communication network(s). Additionally, there may be more or fewer devices than client computing device 104, appraisal management server 120, vehicle information server 130, damage evidence server 140, and/or collision repair information server 150.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

Figure 7:
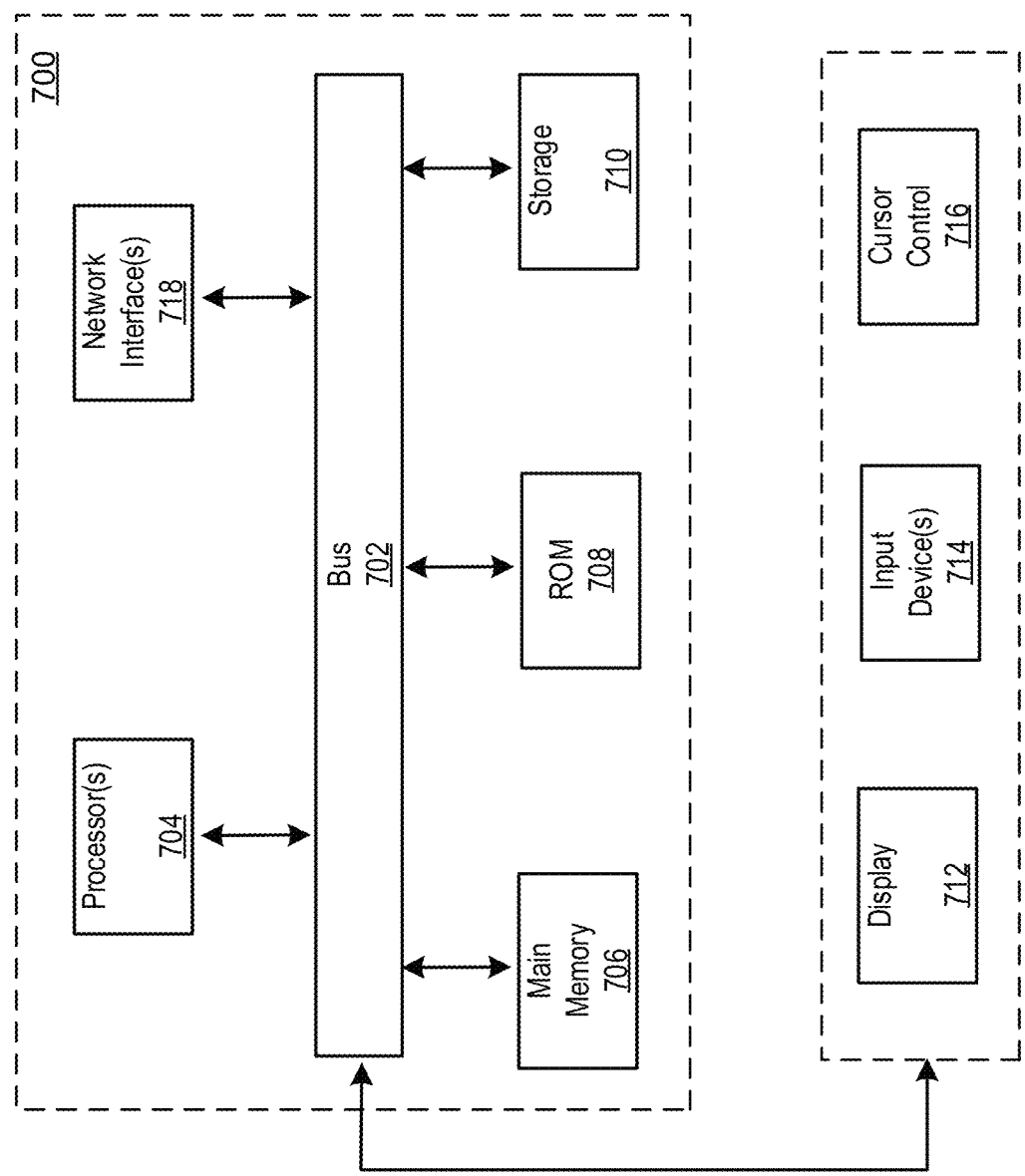
FIG. 7 illustrates an example computing system that may be used in implementing various features of embodiments of the disclosed technology.

Standard System

Where circuits are implemented in whole or in part using software, in one embodiment, these software elements can be implemented to operate with a computing or processing system capable of carrying out the functionality described with respect thereto. One such example computing system is shown in FIG. 7. Various embodiments are described in terms of this example-computing system 700. After reading this description, it will become apparent to a person skilled in the relevant art how to implement the technology using other computing systems or architectures.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a transparent heads-up display (HUD) or an optical head-mounted display (OHMD), for displaying information to a computer user. An input device 714, including a microphone, is coupled to bus 702 for communicating information and command selections to processor 704. An output device 716, including a speaker, is coupled to bus 702 for communicating instructions and messages to processor 704.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 705. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 705. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
   a user computing device;
   an appraisal management computing apparatus comprising:
      a processor; and
      a memory storing computer-executable instructions that, when executed by the processor, cause the appraisal management computing apparatus to:
         receive a plurality of damage evidence files comprising images of a vehicle damaged during an adverse incident;
         identify vehicle information based on a vehicle identification number (VIN) associated with the vehicle, the vehicle information specifying at least a body type;
         identify a damaged panel of the vehicle based on the damage evidence files by applying the damage evidence files as input to a trained deep neural network (DNN) that has synaptic weights that have been trained using semi-supervised machine learning techniques to encode historical correspondences between damage evidence files and vehicle panels, wherein the DNN comprises multiple stacked layers including an input layer, an output layer, and multiple hidden processing layers between the input layer and the output layer that perform transformations for aspects of automated damage appraisal, and wherein responsive to the input, the DNN identifies the damaged panel;
         determine repair information related to repairing the damaged panel based on the vehicle information;
         determine at least one part (i) that is adjacent to the damaged panel and that may be damaged during repair of the damaged panel based on the repair information and at least one rule of adjacency;
         identify at least one repair estimate fragment for the at least one part; and generate a repair estimate line comprising the at least one repair estimate fragment.

2. The system of claim 1, wherein the repair estimate fragment comprises a plurality of tasks associated with repairing or replacing the at least one part.

3. The system of claim 2, wherein the repair line estimate comprises the plurality of tasks associated with repairing or replacing the at least one part.

4. The system of claim 3, wherein the repair line estimate is incorporated into an automatic appraisal of damage to the vehicle damaged during the adverse incident.

5. The system of claim 1, wherein the vehicle type comprises a vehicle body type.

6. The system of claim 5, wherein the at least one rule of adjacency is determined based on the vehicle body type.

7. The system of claim 1, wherein vehicle information comprises extracting data from the VIN, wherein the VIN is associated with the damaged vehicle.

8. The system of claim 1, wherein the damage evidence files comprise at least an image file, a video file, or a 3D scan file.

9. A method comprising:
receiving, by a damage assessment computing apparatus, a plurality of damage evidence files comprising images of a vehicle damaged during an adverse incident;
identifying, by the damage assessment computing apparatus, vehicle information based on a vehicle identification number (VIN) associated with the vehicle, the vehicle information specifying at least a body type; and
identifying a damaged panel of the vehicle based on the damage evidence files by applying the damage evidence files as input to a trained deep neural network (DNN) that has synaptic weights that have been trained using semi-supervised machine learning techniques to encode historical correspondences between damage evidence files and vehicle panels, wherein the DNN comprises multiple stacked layers including an input layer, an output layer, and multiple hidden processing layers between the input layer and the output layer that perform transformations for aspects of automated damage appraisal, and wherein responsive to the input, the DNN identifies the damaged panel;
determining repair information related to repairing the damaged panel based on the vehicle information;
determining, by an adjacent panel determination computing apparatus, at least one part (i) that is adjacent to the damaged panel and (ii) that may be damaged during repair of the damaged panel based on the repair information and at least one rule of adjacency;
identifying, by the adjacent panel determination computing apparatus, at least one repair estimate fragment for the at least one part; and
generating, by a repair estimate generating computing apparatus, a repair estimate line comprising the at least one repair estimate fragment.

10. The method of claim 9, wherein the repair estimate fragment comprises a plurality of tasks associated with repairing or replacing the at least one part.

11. The method of claim 10, wherein the repair line estimate comprises the plurality of tasks associated with repairing or replacing the at least one part.

12. The method of claim 11, wherein the repair line estimate is incorporated into an automatic appraisal of damage to the vehicle damaged during the adverse incident.

13. The method of claim 9, wherein the vehicle type comprises a vehicle body type.

14. The method of claim 13, wherein the at least one rule of adjacency is determined based on the vehicle body type.

15. The method of claim 9, wherein vehicle information comprises extracting data from the VIN, wherein the VIN is associated with the damaged vehicle.

16. The method of claim 9, wherein the damage evidence files comprise at least an image file, a video file, or a 3D scan file.

17. A non-transitory computer-readable medium storing computer-executable instructions that, when executed by a processor of a computing system, cause the computing system to:
receive a plurality of damage evidence files comprising images of a vehicle damaged during an adverse incident;
identify vehicle information based on a vehicle identification number (VIN) associated with the vehicle, the vehicle information specifying at least a body type;
identify a damaged panel of the vehicle based on the damage evidence files by applying the damage evidence files as input to a trained deep neural network (DNN) that has synaptic weights that have been trained using semi-supervised machine learning techniques to encode historical correspondences between damage evidence files and vehicle panels, wherein the DNN comprises multiple stacked layers including an input layer, an output layer, and multiple hidden processing layers between the input layer and the output layer that perform transformations for aspects of automated damage appraisal, and wherein responsive to the input, the DNN identifies the damaged panel;
determine repair information related to repairing the damaged panel based on the vehicle information;
determine at least one part (i) that is adjacent to the damaged panel and (ii) that may be damaged during repair of the damaged panel based on the repair information and at least one rule of adjacency;
identify at least one repair estimate fragment for the at least one part; and
generate a repair estimate line comprising the at least one repair estimate fragment.

18. The non-transitory computer-readable medium of claim 17, wherein the repair estimate fragment comprises a plurality of tasks associated with repairing or replacing the at least one part.

19. The non-transitory computer-readable medium of claim 18, wherein the repair line estimate comprises the plurality of tasks associated with repairing or replacing the at least one part.

20. The non-transitory computer-readable medium of claim 19, wherein the repair line estimate is incorporated into an automatic appraisal of damage to the vehicle damaged during the adverse incident.

* * * * *